US011080290B2

(12) United States Patent
Rana et al.

(10) Patent No.: US 11,080,290 B2
(45) Date of Patent: Aug. 3, 2021

(54) PERFORMANCE IMPROVEMENT IN DATA VISUALIZATION FILTERS

(71) Applicant: SAP SE, Walldorf (DE)

(72) Inventors: Dharmesh Rana, Nadiad (IN); Swati Krishna Setty, Bangalore (IN); Tejram Jagannath Sonwane, Bangalore (IN)

(73) Assignee: SAP SE, Walldorf (DE)

(*) Notice: Subject to any disclaimer, the term of this patent is extended or adjusted under 35 U.S.C. 154(b) by 150 days.

(21) Appl. No.: 15/373,980

(22) Filed: Dec. 9, 2016

(65) Prior Publication Data

US 2018/0165283 A1   Jun. 14, 2018

(51) Int. Cl.
*G06F 16/248*   (2019.01)
*G06F 16/22*    (2019.01)

(52) U.S. Cl.
CPC ........ *G06F 16/248* (2019.01); *G06F 16/2228* (2019.01)

(58) Field of Classification Search
CPC ... G06F 16/248; G06F 16/2228; G06Q 10/10; G06C 30/0201
See application file for complete search history.

(56) References Cited

U.S. PATENT DOCUMENTS

| | | | |
|---|---|---|---|
| 6,993,533 B1* | 1/2006 | Barnes | G06F 16/248 |
| 8,812,960 B1* | 8/2014 | Sun | G06Q 10/10 |
| | | | 715/757 |
| 9,141,515 B1 | 9/2015 | Sonwane et al. | |
| 2005/0091606 A1* | 4/2005 | Sauermann | G06F 17/212 |
| | | | 715/788 |
| 2009/0172516 A1* | 7/2009 | Gill | G06F 9/453 |
| | | | 715/228 |
| 2014/0214807 A1* | 7/2014 | Ganapathi | G06F 16/2425 |
| | | | 707/722 |
| 2014/0379690 A1* | 12/2014 | Ahmed | G06F 17/30466 |
| | | | 707/713 |
| 2015/0293948 A1 | 10/2015 | Balasubramanian et al. | |
| 2016/0140204 A1* | 5/2016 | Brown | G06Q 10/101 |
| | | | 707/602 |

* cited by examiner

*Primary Examiner* — Charles D Adams
(74) *Attorney, Agent, or Firm* — Fish & Richardson P.C.

(57) ABSTRACT

A document is received, the document including metadata for a data visualization of a data set. The data set includes a plurality of data columns, each of the plurality of columns having a column name and a plurality of data values. A first set of columns of the plurality of columns is present in the data visualization. The first set of columns is determined based on the metadata. A second set of columns of the plurality of columns is determined, where the second set of columns includes remaining columns of the plurality of columns excluding the first set of columns. The data set is ordered by having the first set of columns prior to the second set of columns. A composite index is generated on the ordered data set.

14 Claims, 6 Drawing Sheets

| 102 | 104 | 106 | 108 | 110 | 112 |
|---|---|---|---|---|---|
| Category | City | Country | Date | Quantity sold | Sales Revenue |
| Belts,bags,wallets | Milan | Italy | 10/4/2014 12:00:00 AM | 8,500.00 | 34,446.00 |
| Belts,bags,wallets | Melbourne | Australia | 10/12/2014 12:00:00 AM | 7,000.00 | 27,433.00 |
| Belts,bags,wallets | Sydney | Australia | 11/18/2014 12:00:00 AM | 3,450.00 | 11,635.00 |
| Belts,bags,wallets | Toulouse | France | 11/26/2014 12:00:00 AM | 2,828.00 | 11,144.90 |
| Belts,bags,wallets | Alexandria | Egypt | 11/22/2014 12:00:00 AM | 4,650.00 | 17,541.00 |
| Belts,bags,wallets | Miami | USA | 12/17/2014 12:00:00 AM | 2,650.00 | 1,858.00 |
| Belts,bags,wallets | London | United Kin | 12/29/2014 12:00:00 AM | 19,950.00 | 79,208.00 |
| Belts,bags,wallets | Liverpool | United Kin | 12/5/2014 12:00:00 AM | 4,600.00 | 17,525.00 |
| Belts,bags,wallets | Mumbai | India | 12/29/2014 12:00:00 AM | 16,500.00 | 65,550.00 |
| Belts,bags,wallets | Delhi | India | 10/11/2014 12:00:00 AM | 7,450.00 | 28,068.00 |
| Belts,bags,wallets | San Franc | USA | 10/10/2014 12:00:00 AM | 5,850.00 | 123.00 |
| Belts,bags,wallets | Washington | USA | 11/21/2014 12:00:00 AM | 3,800.00 | 432.75 |
| Belts,bags,wallets | Los Angel | USA | 12/7/2014 12:00:00 AM | 5,800.00 | 927.75 |
| Belts,bags,wallets | New York | USA | 11/10/2014 12:00:00 AM | 13,750.00 | 738.00 |
| Belts,bags,wallets | Chicago | USA | 11/19/2014 12:00:00 AM | 6,550.00 | 526.50 |
| Belts,bags,wallets | Berlin | Germany | 10/31/2014 12:00:00 AM | 5,550.00 | 21,178.00 |
| Belts,bags,wallets | Frankfurt | Germany | 12/26/2014 12:00:00 AM | 4,000.00 | 14,495.00 |
| 2 Pocket shirts | Milan | Italy | 11/26/2014 12:00:00 AM | 5,450.00 | 24,320.00 |
| 2 Pocket shirts | Rome | Italy | 12/8/2014 12:00:00 AM | 4,800.00 | 20,064.00 |
| 2 Pocket shirts | Chicago | USA | 11/24/2014 12:00:00 AM | 3,950.00 | 6,212.25 |
| 2 Pocket shirts | San Franc | USA | 10/13/2014 12:00:00 AM | 3,750.00 | 428.25 |
| 2 Pocket shirts | Berlin | Germany | 11/21/2014 12:00:00 AM | 5,950.00 | 27,000.00 |
| 2 Pocket shirts | Frankfurt | Germany | 11/12/2014 12:00:00 AM | 4,450.00 | 18,382.00 |
| T-Shirts | Rome | Italy | 12/4/2014 12:00:00 AM | 42,350.00 | 168,288.00 |
| T-Shirts | Milan | Italy | 12/26/2014 12:00:00 AM | 62,100.00 | 242,994.00 |
| T-Shirts | Melbourne | Australia | 12/26/2014 12:00:00 AM | 66,450.00 | 263,497.00 |
| T-Shirts | London | United Kin | 11/24/2014 12:00:00 AM | 108,500.00 | 430,870.00 |
| T-Shirts | Liverpool | United Kin | 11/13/2014 12:00:00 AM | 40,050.00 | 154,805.00 |
| T-Shirts | Delhi | India | 10/20/2014 12:00:00 AM | 84,750.00 | 341,128.00 |
| T-Shirts | Mumbai | India | 12/7/2014 12:00:00 AM | 89,800.00 | 356,582.00 |
| T-Shirts | Washington | USA | 12/29/2014 12:00:00 AM | 33,350.00 | 129,004.00 |
| T-Shirts | New York | USA | 10/24/2014 12:00:00 AM | 74,800.00 | 297,152.00 |
| T-Shirts | San Franc | USA | 10/29/2014 12:00:00 AM | 42,800.00 | 167,582.00 |
| T-Shirts | Chicago | USA | 12/22/2014 12:00:00 AM | 38,350.00 | 152,648.00 |
| T-Shirts | Los Angel | USA | 11/20/2014 12:00:00 AM | 55,350.00 | 219,581.00 |
| T-Shirts | Berlin | Germany | 11/30/2014 12:00:00 AM | 48,400.00 | 187,056.00 |
| T-Shirts | Frankfurt | Germany | 10/16/2014 12:00:00 AM | 43,000.00 | 166,075.00 |
| Belts,bags,wallets | Rome | Italy | 8/19/2014 12:00:00 AM | 4,250.00 | 12,079.00 |

PERFORMANCE IMPROVEMENT IN DATA VISUALIZATION FILTERS

BACKGROUND

A data visualization application (DVA), such as SAP LUMIRA, can be a self-service visualization tool where an end user can acquire a data set and create visualizations of the data set according to his or her business needs. The DVA can create The DVA can create graphical user interface (GUI) dashboards which make data easy to visualize and to share between users. When a user opens a dashboard, a DVA can form queries, such as structured query language (SQL) queries, to execute on the data set, and results of the queries can be transformed into different visualizations. The user can further apply filters to the data of visualizations to gain more insights into the data set.

A data set typically includes a number of data columns, each column having a column name and a number of data values. Query operations on a data set can be optimized to speed up query executions. For example, similar to creating an index for a book, indexes can be created for a data set so that it is easy to locate the data during query operations. In some cases, a simple index can be created on one data column. The simple index can include data values of that column in a certain order (for example, an ascending or descending order) and location information of the data values. In some cases, a composite index can be created on multiple data columns. The composite index can include concatenated data values of multiple data columns and associated location information. A query can be executed efficiently if the data columns involved in the query are present in the index.

A DVA is usually a self-service tool, and an end user may not have knowledge on how to optimize query operations. In some cases, a database administrator (DBA) can create indexes for a data set, but the DBA may not have knowledge of the end user's business needs. For example, the DBA may create an index on all columns of the data set while the visualization may need only data from a few columns (not all columns), and the index created by the DBA is not useful. In some cases, a DVA can automatically create an index on visualization columns (that is, columns present in the visualization) based on visualization metadata. However, this works fine if the user does not apply any filters to non-visualization columns (that is, a column or columns not present in the visualization). When a user applies filters to the non-visualization columns, the data columns needed for the visualization change and the index created (based on the visualization columns) is not useful, which causes queries to take more time to execute. It is difficult to create all indexes for all possible combinations of filters for a single visualization, because the creation causes performance degradation and storage overload on the data source.

SUMMARY

The present disclosure describes methods and systems, including computer-implemented methods, computer program products, and computer systems for performance improvement in data visualization filters.

In an implementation, a document is received, the document including metadata for a data visualization of a data set. The data set includes a plurality of data columns, each of the plurality of columns having a column name and a plurality of data values. A first set of columns of the plurality of columns is present in the data visualization. The first set of columns is determined based on the metadata. A second set of columns of the plurality of columns is determined, where the second set of columns includes remaining columns of the plurality of columns excluding the first set of columns. The data set is ordered by having the first set of columns prior to the second set of columns. A composite index is generated on the ordered data set.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described approach enables automatic creation of indexes for all types of operation on a data visualization without manual processes. Second, the described approach optimizes index creation and does not create extra indexes. Third, the optimized index creation process can reduce an amount of data storage. Fourth, the described approach executes queries efficiently for all types of operation on a data visualization, and enhances the data visualization performance for all types of operations. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes performance improvement in data visualization filters and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

A data visualization application (DVA), such as SAP LUMIRA, can be a self-service visualization tool where an end user can acquire a data set and create visualizations of the data set according to his or her business needs. The DVA can create graphical user interface (GUI) dashboards which make data easy to visualize and to share between users. When a user opens a dashboard, a DVA can form queries, such as structured query language (SQL) queries, to execute on the data set, and results of the queries can be transformed into different visualizations. The user can further apply filters to the data of visualizations to gain more insights into the data set.

A data set typically includes a number of data columns, each column having a column name and a number of data values. Query operations on a data set can be optimized to speed up query executions. For example, similar to creating an index for a book, indexes can be created for a data set so that it is easy to locate the data during query operations. In some cases, a simple index can be created on one data column. The simple index can include data values of that column in a certain order (for example, an ascending or descending order) and location information of the data values. In some cases, a composite index can be created on multiple data columns. The composite index can include concatenated data values of multiple data columns and associated location information. A query can be executed efficiently if the data columns involved in the query are present in the index.

A DVA is usually a self-service tool, and an end user may not have knowledge on how to optimize query operations. In some cases, a database administrator (DBA) can create indexes for a data set, but the DBA may not have knowledge of the end user's business needs. For example, the DBA may create an index on all columns of the data set while the visualization may need only data from a few columns (not all columns), and the index created by the DBA is not useful. In some cases, a DVA can automatically create an index on visualization columns (that is, columns present in the visualization) based on visualization metadata. However, this works fine if the user does not apply any filters to non-visualization columns (that is, a column or columns not present in the visualization). When a user applies filters to the non-visualization columns, the data columns needed for the visualization change and the index created (based on the visualization columns) is not useful, which causes queries to take more time to execute. It is difficult to create all indexes for all possible combinations of filters for a single visualization, because the creation causes performance degradation and storage overload on the data source.

At a high-level, the described approach optimizes index creations for a data set so that query operations for data visualizations of the data set can be executed efficiently. In a typical implementation, a DVA allows an end user to design a dashboard based on his or her business needs. The dashboard can include one or more data visualizations of a data set. Once a dashboard design completes, the DVA creates a composite index for each visualization. If the dashboard includes multiple visualizations, the DVA can create multiple composite indexes. For a given visualization, the DVA creates a single composite index on all data columns, where the data columns are arranged in a specific order, that is, first the visualization columns and then non-visualization columns. The order of the columns is important in the composite index. To execute the data visualization, the DVA generates a query involving all data columns. For the non-visualization columns without any filter operations, the query includes NOT filters with filter values that do not exist in the data set so that all data values in these columns will be returned. The query can be executed efficiently because the data columns involved in the query are present in the optimized composite index.

Figure 1:
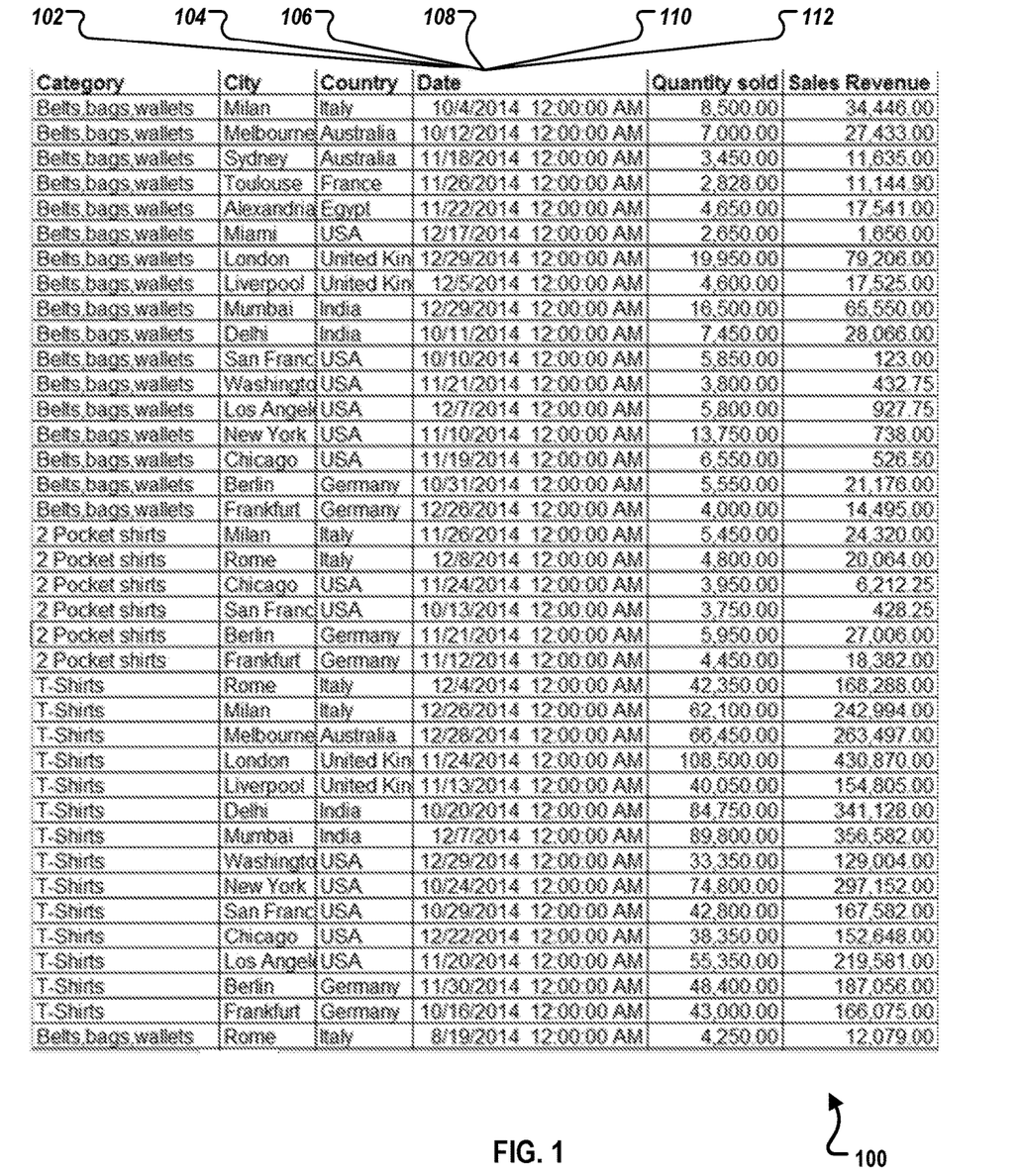
FIG. 1 is a snapshot illustrating an example data set, according to an implementation.

FIG. 1 is a snapshot illustrating an example data set 100, according to an implementation. The data set 100 includes sales data of garment industry, collected from various garment stores located at different places. The data set 100 includes six data columns, Category 102, City 104, Country 106, Date 108, Quantity Sold 110, and Sales Revenue 112. Once a DVA acquires the data set 100, a user can create a dashboard in the DVA and analyze the data set 100.

Figure 2:
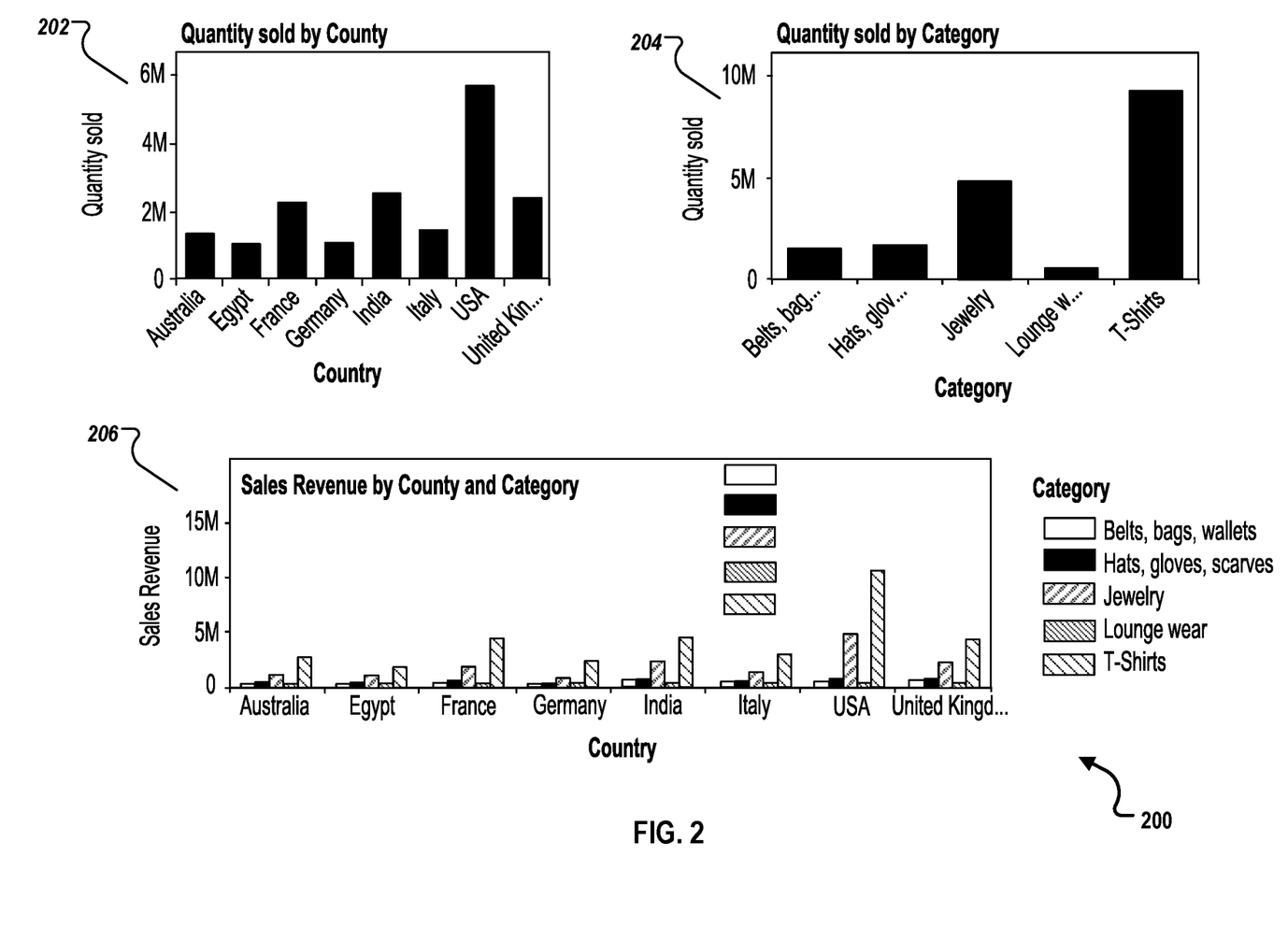
FIG. 2 is a screenshot illustrating an example dashboard, according to an implementation.

FIG. 2 is a screenshot illustrating an example dashboard 200, according to an implementation. The dashboard 200 includes displayed three visualizations of the data set 100 in FIG. 1: Total Quantity Sold by Country 202, Total Quantity Sold by Category 204, and Total Sales Revenue by Country and Category 206.

Total Quantity Sold by Country 202 visualizes quantity of garments sold in different countries, where Quantity Sold 110 and Country 106 are present in the visualization with the horizontal and vertical axis based on Country 106 and Quantity Sold 110, respectively. In Total Quantity Sold by Country 202, Country 106 and Quantity Sold 110 are called visualization columns, while the remaining four columns, Category 102, City 104, Date 108, and Sales Revenue 112, are called non-visualization columns. Similarly, Total Quantity Sold by Category 204 visualizes quantity of garments sold in different categories, where Category 102 and Quantity Sold 110 are visualization columns, and City 104, Country 106, Date 108, and Sales Revenue 112 are non-visualization columns.

In the following, Total Quantity Sold by Country 202 is used as an example visualization to illustrate problems with existing approaches and explain the described approach. For example, in existing approaches, a VDA typically generates an index on the visualization columns, Country 106 and Quantity Sold 110, for the visualization 202. When a user opens the dashboard 200 in the DVA, the DVA generates Query 1, as shown in Table 1, for the visualization 202.

TABLE 1

| Query 1 | |
| --- | --- |
| Query 1 | SELECT 'COUNTRY', SUM('QUANTITY SOLD') FROM XXXTABLE GROUP BY 'COUNTRY' ORDER BY 'COUNTRY', 'QUANTITY SOLD' |

Note that Query 1 can be executed efficiently because the data columns (that is, Quantity Sold 110 and Country 106) involved in Query 1 are present in the index the VDA generated. Now if the user wants to see the data of a specific category in the visualization 202, for example, the user wants to see the quantity of garments sold for different countries only for T-shirts category (that is, applying a filter 'CATEGORY'='T-Shirts' on the non-visualization column Category 102), the VDA will generate Query 2, as shown in Table 2.

TABLE 2

| | Query 2 |
|---|---|
| Query 2 | SELECT 'COUNTRY', SUM('QUANTITY SOLD') FROM XXXTABLE GROUP BY 'COUNTRY' WHERE 'CATEGORY' = 'T-Shirts' ORDER BY 'COUNTRY', 'QUANTITY SOLD' |

Note that Query 2 cannot be executed efficiently, because Query 2 includes three columns, Country 106, Quantity Sold 110, and Category 102, while the index generated by the VDA is only on Country 106 and Quantity Sold 110 but not on Category 102. Hence, the generated index is not useful for Query 2 and it will take more time to execute Query 2. Note that Query 2 can be executed faster if an index has been created on all three columns. Imagine next time the user may apply filter(s) on another or multiple non-visualization columns. To support all combinations of filters, existing approaches need to create many indexes, which increases the size of data source, consumes more memory, and may cause the VDA to crash in a restricted resource environment.

The described approach creates a composite index on all columns, first adding the visualization columns and then the remaining non-visualization columns. In some implementations, when adding the visualization columns, the column of the horizontal axis is added first and then the column of the vertical axis. For example, the composite index for the visualization 202 can be created on columns with the following order: Country 106, Quantity Sold 110, Category 102, City 104, Date 108, and Sales Revenue 112.

For each of the non-visualization columns, the described approach generates a unique value which does not exist in that column. For example, the VDA can generate the following unique values which do not exist in the data set 100 for the non-visualization columns Category 102, City 104, Date 108, and Sales Revenue 112:

CATEGORY→2A1C6DF0-ACFD-47F8-8FF0-693B335203EF
    CITY→693B335203EF-47F8-8FF0-2A1C6DF0-ACFD
    DATE→99/99/9999 99:99:99 AM
    SALES REVENUE→999999999999.999999999999

When the user opens the dashboard 200 and no filters are applied to the visualization 202, the VDA can generate Query 3, as shown in Table 3, where for each of the non-visualization columns, a NOT filter (that is, NOT EQUAL TO the unique value of that column) is added to the query so that all data in that column will be returned (that is, no data in that column is filtered out).

TABLE 3

| | Query 3 |
|---|---|
| Query 3 | SELECT 'COUNTRY', SUM('QUANTITY SOLD') FROM XXXTABLE GROUP BY 'COUNTRY' WHERE 'CATEGORY' != '2A1C6DF0-ACFD-47F8-8FF0-693B335203EF' AND CITY != '693B335203EF-47F8-8FF0-2A1C6DF0-ACFD' AND DATE != '99/99/9999 99:99:99 AM' AND 'SALES REVENUE' != 999999999999.999999999999 ORDER BY 'COUNTRY', 'QUANTITY SOLD' |

Note that Query 3 in Table 3 and Query 1 in Table 1 give same results but take different times for execution. For example, if the data set 100 has one million rows, Query 1 takes 17 seconds to execute while Query 3 takes only 2 seconds.

Consider the case when the user applies a filter 'CATEGORY'='T-Shirts' in the visualization 202, that is, the user wants to visualize Total Quantity Sold by Country for the T-Shirts Category. The VDA can generate Query 4, as shown in Table 4, where the filter 'CATEGORY'='T-Shirts' is applied to the non-visualization column Category 102, and NOT filters using the respective unique values are applied to the remaining non-visualization columns City 104, Date 108, and Sales Revenue 112.

TABLE 4

| | Query 4 |
|---|---|
| Query 4 | SELECT 'COUNTRY', SUM('QUANTITY SOLD') FROM XXXTABLE GROUP BY 'COUNTRY' WHERE 'CATEGORY' = 'T-Shirts' AND 'CITY' != '693B335203EF-47F8-8FF0-2A1C6DF0-ACFD' AND 'DATE' != '99/99/9999 99:99:99 AM' AND 'SALES REVENUE' != 999999999999.999999999999 ORDER BY 'COUNTRY', 'QUANTITY SOLD' |

Note that Query 4 in Table 4 and Query 2 in Table 2 give same results but take different times for execution. For example, if the data set 100 has one million rows, Query 2 takes 11 seconds to execute while Query 4 takes only 1 second.

Figure 3:
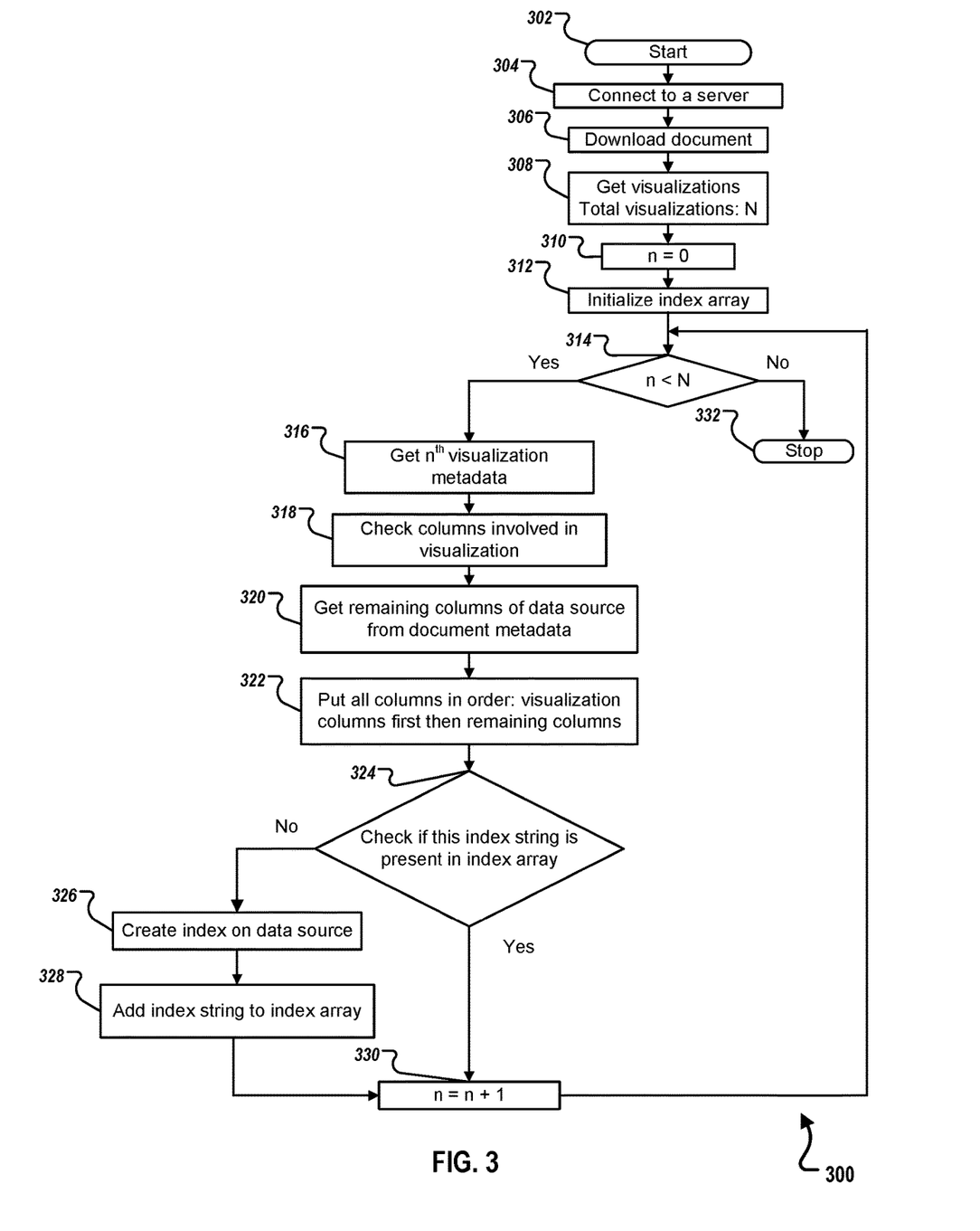
FIG. 3 is a flowchart illustrating an example method for generating composite indexes for data visualizations, according to an implementation.

FIG. 3 is a flowchart illustrating an example method 300 for generating composite indexes for data visualizations, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

At 302, method 300 starts. From 302, method 300 proceeds to 304.

At 304, a VDA connects to a server, for example, a business object enterprise (BOE) server. From 304, method 300 proceeds to 306.

At 306, the VDA downloads a document from the server. The document is associated with a dashboard that includes one or more visualizations of a data set. The document can have document metadata. The document metadata includes metadata of each visualization present in the document and metadata of the data set. Visualization metadata contains information of the dataset columns which are present in a particular visualization (that is, information of visualization columns) whereas dataset metadata contains information of all columns of the data set. In some implementations, the document can include the data set. For each visualization, the visualization metadata can indicate the mapping between the visualization columns and the horizontal and vertical axis in the visualization. From 306, method 300 proceeds to 308.

At 308, based on the downloaded document, the VDA determines a total number of visualizations in the dashboard, N. From 308, method 300 proceeds to 310.

At 310, the VDA initializes a variable n to zero. The variable n is used to indicate the visualization which the VDA is currently processing. From 310, method 300 proceeds to 312.

At 312, the VDA initializes an index array, for example, to an empty array. As will be discussed below, the index array is used to store index strings of composite indexes for the one or more visualizations. From 312, method 300 proceeds to 314.

At 314, the VDA determines whether the variable n is less than the total number of visualizations in the dashboard. If the variable n is less than the total number of visualizations N, the VDA starts to process the $n^{th}$ visualization. the method 300 proceeds to 316.

At 316, the VDA obtains visualization metadata of the $n^{th}$ visualization, for example, from the downloaded document. From 316, method 300 proceeds to 318.

At 318, based on the visualization metadata, the VDA identifies which columns are visualization columns in the $n^{th}$ visualization. The VDA can obtain data values of the visualization columns from the downloaded document. From 318, method 300 proceeds to 320.

At 320, the VDA obtains remaining non-visualization columns of the $n^{th}$ visualization from the document metadata. For example, the columns that are in the document metadata but not in the visualization metadata of the $n^{th}$ visualization are the non-visualization columns. In some cases, the VDA may obtain data values of the non-visualization columns from the downloaded document. From 320, method 300 proceeds to 322.

At 322, the VDA orders all columns in the data set in a specific way, where the visualization columns are included first and then the remaining non-visualization columns. In some implementations, when including the visualization columns, the column of the horizontal axis in the $n^{th}$ visualization is included first and then the column of the vertical axis. From 322, method 300 proceeds to 324.

At 324, the VDA determines whether an index string of the ordered columns is present in the index array. The index string can include the column names of the ordered columns. For example, for the visualization Total Quantity Sold by Country 202 in FIG. 2, the ordered columns are Country 106, Quantity Sold 110, Category 102, City 104, Date 108, and Sales Revenue 112, and the corresponding index string is "COUNTRY, QUANTITY SOLD, CATEGORY, CITY, DATE, SALES REVENUE." If the index string is already in the index array, method 300 proceeds from 324 to 330. Otherwise, if the index string is not in the index array, method 300 proceeds from 324 to 326.

At 326, the VDA creates a composite index on the ordered data set where columns are ordered as described in 322. Note that if the dashboard includes multiple visualizations which have the same ordered data set, method 300 will only create one composite index. From 326, method 300 proceeds to 328.

At 328, the VDA adds the index string to the index array. From 328, method 300 proceeds to 330.

At 330, the VDA increases the variable n by one. From 330, method 300 returns to 314 to process the next visualization. For each visualization, the VDA repeats 314 to 330 as appropriate. If all the visualizations in the dashboard have been processed, method 300 proceeds from 314 to 332.

At 332, method 300 stops.

Figure 4:
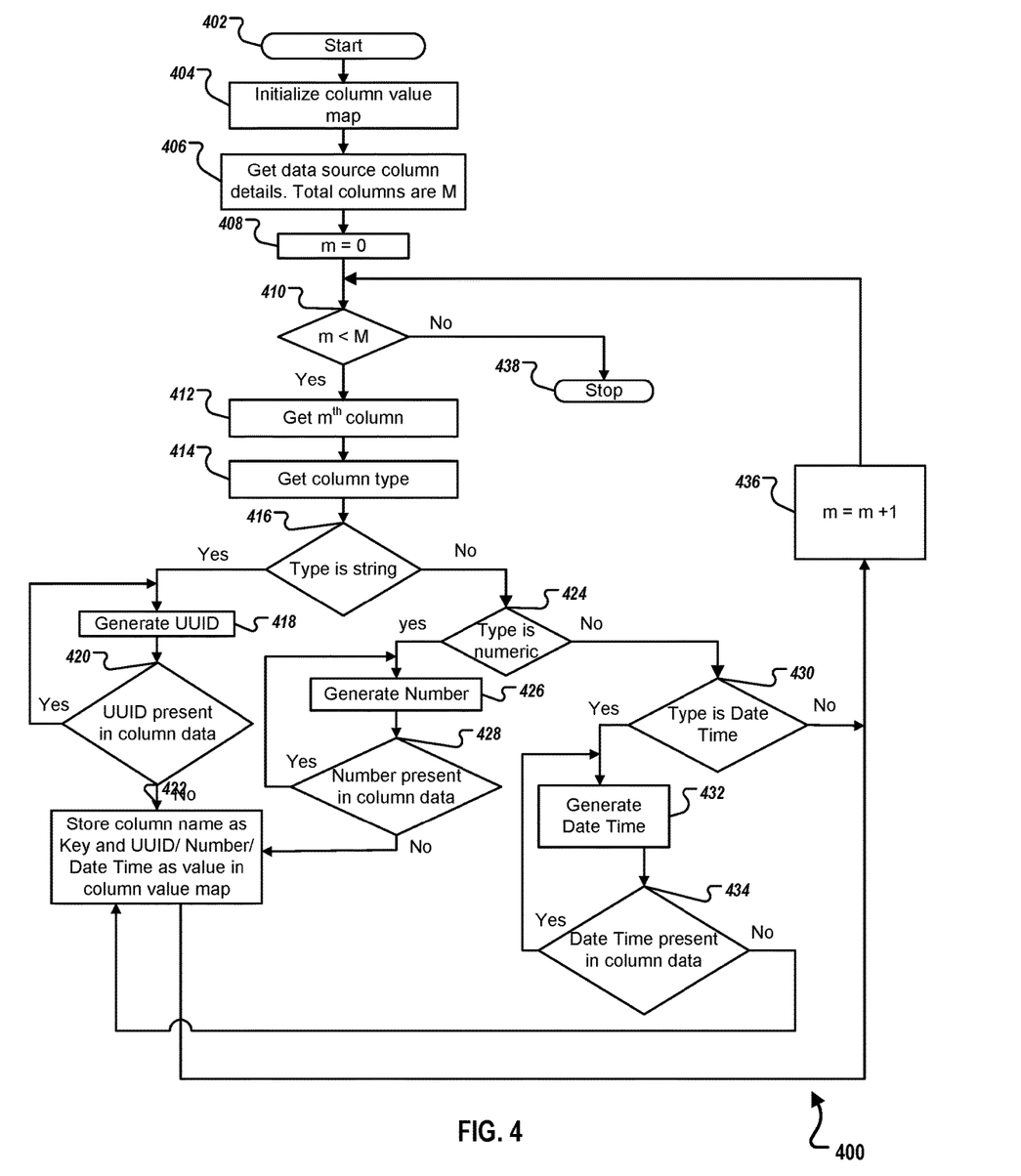
FIG. 4 is a flowchart illustrating an example method for generating unique values for filters, according to an implementation.

FIG. 4 is a flowchart illustrating an example method 400 for generating unique values for filters, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402, method 400 starts. From 402, method 400 proceeds to 404.

At 404, the VDA initializes a column value map. The map is used to store unique values for filters. From 402, method 400 proceeds to 404.

At 406, the VDA obtains column details of a data set, for example, based on a downloaded document described in FIG. 3. In some implementations, based on the downloaded document and the document metadata, the VDA can determine a total number of columns in the data set and obtain data values in each column. From 406, method 400 proceeds to 408.

At 408, the VDA initializes a variable m to zero. The variable m is used to indicate the column for which the VDA is currently generating a unique value. From 408, method 400 proceeds to 410.

At 410, the VDA determines whether the variable m is less than the total number of columns in the data set. If the variable m is less than the total number of columns M, the VDA starts to generate a unique value for the $m^{th}$ column, where the unique value is a value that does not exist in the $m^{th}$ column. From 410, the method 400 proceeds to 412.

At 412, the VDA obtains data in the $m^{th}$ column, for example, from the downloaded document. From 412, method 400 proceeds to 414.

At 414, the VDA determines the data type of the $m^{th}$ column, for example, based on the downloaded document or the document metadata. From 414, method 400 proceeds to 416.

At 416, the VDA determines whether the data type of the $m^{th}$ column in string. If the data type is string, method 400 proceeds to 418. Otherwise, if the data type is not string, method 400 proceeds to 424.

At 418, the VDA generates a Universally Unique Identifier (UUID). For example, a UUID can be a string of 36 characters which is generated randomly. From 418, method 400 proceeds to 420.

At 420, the VDA determines whether the generated UUID is present in the data of the $m^{th}$ column. If the UUID is present in the $m^{th}$ column, method 400 returns to 418 to generate another UUID. Otherwise, if the UUID is not present in the $m^{th}$ column, method 400 proceeds to 422.

At 422, the VDA stores the name of the $m^{th}$ column and the UUID in the column value map. For example, the VDA can store the name of the $m^{th}$ column as Key and the UUID as Value in the map. From 422, method 400 proceeds to 436.

At 424, the VDA determines whether the data type of the $m^{th}$ column in numeric. If the data type is numeric, method 400 proceeds to 426. Otherwise, if the data type is not numeric, method 400 proceeds to 430.

At 426, the VDA generates a number, for example, randomly generated. From 426, method 400 proceeds to 428.

At 428, the VDA determines whether the generated number is present in the data of the $m^{th}$ column. If the number is present in the $m^{th}$ column, method 400 returns to 426 to generate another number. Otherwise, if the number is not present in the $m^{th}$ column, method 400 proceeds to 422, where the VDA can store the name of the $m^{th}$ column as Key and the number as Value in the column value map.

At 430, the VDA determines whether the data type of the $m^{th}$ column is Date and Time. If the data type is Date and Time, method 400 proceeds to 432. Otherwise, if the data type is not Date and Time, method 400 proceeds to 436.

At 432, the VDA generates a date and time, for example, randomly generated.

From 426, method 400 proceeds to 434.

At 434, the VDA determines whether the generated date and time is present in the data of $m^{th}$ column. If the generated date and time is present in the $m^{th}$ column, method 400 returns to 432 to generate another date and time. Otherwise, if the generated date and time is not present in the $m^{th}$ column, method 400 proceeds to 422, where the VDA can store the name of the $m^t$ column as Key and the generated data and time as Value in the column value map.

At 436, the VDA increases the variable m by one. From 436, method 400 returns to 410 to generate a unique value for the next column. For each column, the VDA repeats 410 to 434 as appropriate. If all the columns have been processed, method 400 proceeds from 410 to 438.

At 438, method 400 stops.

Figure 5:
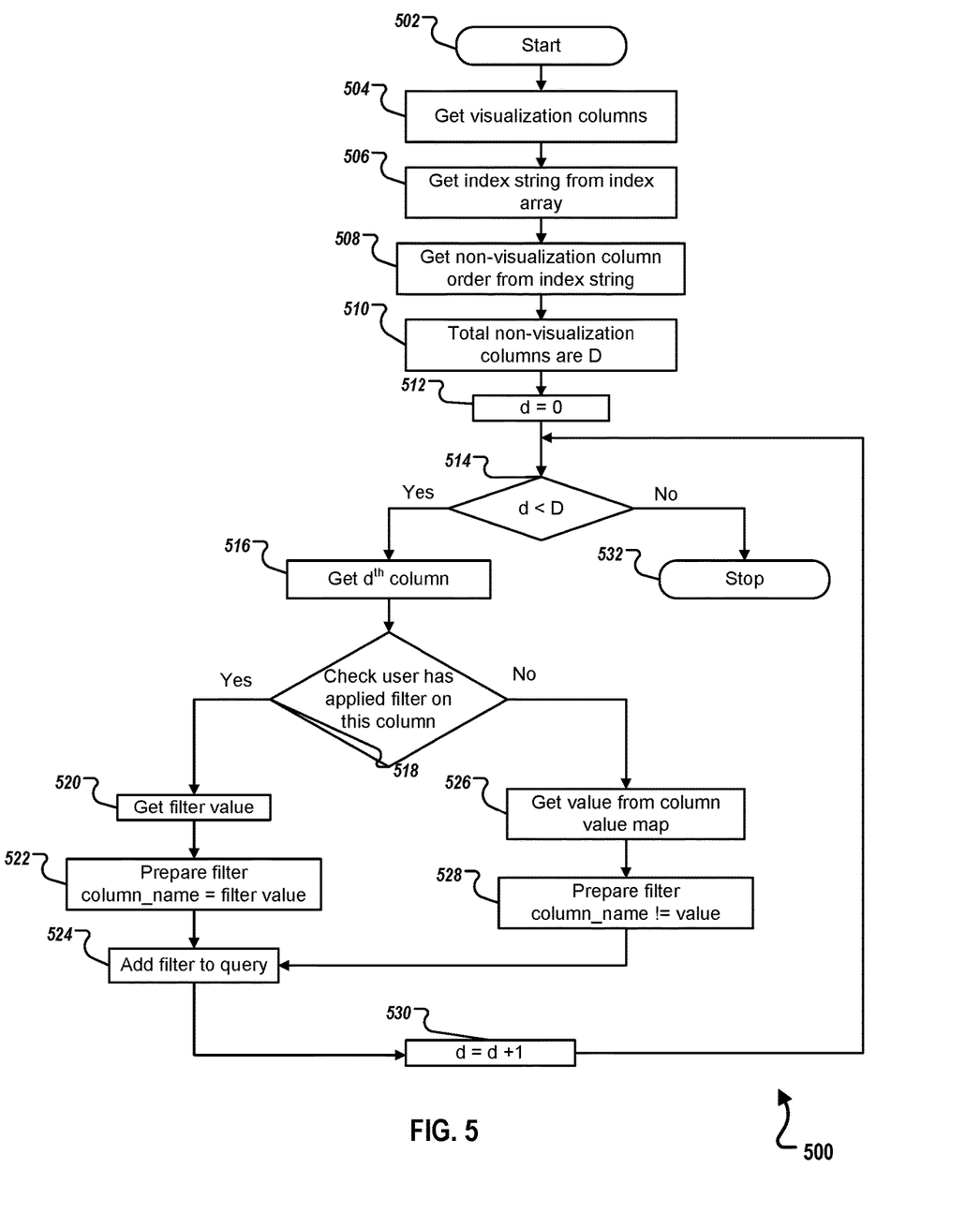
FIG. 5 is a flowchart illustrating an example method for generating a query for a data visualization, according to an implementation.

FIG. 5 is a flowchart illustrating an example method 500 for generating a query for a data visualization, according to an implementation. For clarity of presentation, the description that follows generally describes method 500 in the context of the other figures in this description. However, it will be understood that method 500 may be performed, for example, by any suitable system, environment, software, and hardware, or a combination of systems, environments, software, and hardware as appropriate. In some implementations, various steps of method 500 can be run in parallel, in combination, in loops, or in any order.

At 502, method 500 starts. From 502, method 500 proceeds to 504.

At 504, the VDA determines visualization columns of the visualization, for example, based on visualization metadata in a downloaded document described in FIG. 3. The visualization can be one of the visualizations in a dashboard. From 504, method 500 proceeds to 506.

At 506, the VDA obtains an index string of the visualization from an index array described in FIG. 3. From 506, method 500 proceeds to 508.

At 508, based on the index string, the VDA determines an order of the non-visualization columns. For example, the VDA can remove the names of the visualization columns from the index string, and the remained index string represents an order of the non-visualization columns. From 506, method 500 proceeds to 510.

At 510, the VDA determines a total number of non-visualization columns, for example, based on the index string with the names of the visualization columns removed. From 506, method 500 proceeds to 512.

At 512, the VDA initialized a variable d to zero. The variable d is used to indicate the non-visualization column that the VDA is currently processing. From 512, method 500 proceeds to 514.

At 514, the VDA determines whether the variable d is less than the total number of non-visualization columns. If the variable m is less than the total number of non-visualization columns D, the VDA starts to generate a filter for the $d^{th}$ column. From 514, the method 500 proceeds to 516.

At 516, the VDA obtains information of the $d^{th}$ column, for example, the column name. From 516, the method 500 proceeds to 518.

At 518, the VDA determines whether a user has applied a filter on the $d^{th}$ column. If a filter has been applied on the column, method 500 proceeds to 520. Otherwise, if a filter has not been applied on the column, method 500 proceeds to 526.

At 520, the VDA determines a filter value associated with the filter that is applied on the $d^{th}$ column. From 520, the method 500 proceeds to 522.

At 522, the VDA determines the filter for the $d^{th}$ column, for example, the filter can be $d^{th}$ column name=the filter value associated with the $d^{th}$ column. From 522, the method 500 proceeds to 524.

At 524, the VDA adds the filter for the $d^{th}$ column to the query. From 524, the method 500 proceeds to 530.

At 526, the VDA determines a unique value for the $d^{th}$ column based on the column value map described in FIG. 4. From 526, the method 500 proceeds to 528.

At 528, the VDA determines a NOT filter for the $d^{th}$ column, where the filter value is set as the unique value for the $d^{th}$ column. For example, the NOT filter can be $d^{th}$ column name !=the unique value for the $d^{th}$ column. From 528, the method 500 proceeds to 524, where the NOT filter is added to the query.

At 530, the VDA increases the variable d by one. From 530, method 500 returns to 514 to generate the filter for the next non-visualization column. For each non-visualization column, the VDA repeats 514 to 530 as appropriate. If filters have been generated for all the non-visualization columns, method 500 proceeds from 514 to 532.

At 532, method 500 stops

Following is one possible example code snippet for performing the described approach:

```
10  let builder:FilterBuilder = FilterBuilder(dict: metadaDict,defultNullValue:
    "",conn: conn)
11      var filterSQL = ""
12      var filtersid = Array<String>( )
13      if source.getFilters( ).count == 0 {
14          return filterSQL
15      }
16      var filtersdim = ""
17      var filters = Array<String>( )
18      var filterstr = ""
19      var sqls = Dictionary<String,String>( )
20      var avoidIndex = false
21      var prevColumn = ""
22      //getting matched index depending upon select dimension.
23      for index in 0...source.getFilters( ).count-1{
24          let filtertempSQL = try
    builder.buildFilterSql(source.getFilters( )[index])
25          if JSONHelpers.hasField(source.getFilters( )[index], name:
    "attributeId"){
26              var attributeId = JSONHelpers.getString(source.getFilters( )[index],
    key: "attributeId")!
27
28              //Avoiding formula columns for indexing
```

```
29          if (metadaDict[attributeId]?.formula == ""){
30           filterstr += "," + (metadaDict[attributeId]?.columnId)!
31          } else {
32           avoidIndex = true
33          }
34          if (sqls[(metadaDict[attributeId]?.columnId)!] != nil){
35             var temp = sqls[prevColumn]! + " AND " + filtertempSQL
36             sqls.updateValue(temp,forKey: prevColumn)
37          }
38          else{
39             prevColumn = (metadaDict[attributeId]?.columnId)!
40             sqls.updateValue(filtertempSQL,forKey:
     (metadaDict[attributeId]?.columnId)!)
41             filtersid.append((metadaDict[attributeId]?.columnId)!)
42          }
43        }
44     }
45     //getting matched index depending upon select dimension.
46     if indexs.count > 0 && !avoidIndex{
47       for index1 in 0...indexs.count−1{
48         if (indexs[index1].rangeOfString(dimension) != nil){
49            if (dimension.containsString(",") &&
    indexs[index1].hasPrefix(dimension)){
50              if (indexs[index1].rangeOfString(filterstr,
    options:NSStringCompareOptions.BackwardsSearch) != nil){
51                 var range = indexs[index1].rangeOfString(dimension)
52                 filtersdim =
    indexs[index1].substringWithRange(Range(start: (range?.endIndex)! ,end:
    indexs[index1].characters.endIndex))
53              }
54              break;
55           }else{
56              if (indexs[index1].rangeOfString(filterstr,
    options:NSStringCompareOptions.BackwardsSearch) != nil &&
57                 indexs[index1].hasPrefix(dimension)){
58                 filtersdim = indexs[index1]
59                 break
60              }
61
62           }
63         }
64
65       }
66     }
67     //storing metada information so that dpening upon ceate non exist filter in
    sql.
68     var metadatacols = Dictionary<String,String>( )
69     if(filtersdim != ""){
70       filters = filtersdim.characters.split{$0 == ","}.map(String.init)
71       for values in metadaDict.values{
72         for index in 0...filters.count−1{
73           if filters[index] == values.columnId{
74              metadatacols.updateValue(values.dataType, forKey:
    values.columnId)
75           }
76         }
77       }
78     }
79
80
81     //creating filter sql for missing columns from index
82
83     if sqls.count > 0{
84       filterSQL += keywordSPACE + "WHERE" + keywordSPACE
85     }
86     if(filters.count > 0){
87       for index in 0...filters.count−1{
88         var tempFilterSQL = ""
89
90         if sqls[filters[index]] == nil {
91           if (metadatacols[filters[index]] == "string" ||
    (metadatacols[filters[index]] == "date")){
92
93              let uuid = NSUUID( ).UUIDString
94              tempFilterSQL += "!='"
95              tempFilterSQL += uuid + "'"
96           }else if (metadatacols[filters[index]] == "integer"){
97
98              tempFilterSQL += "!=2147483647"
```

-continued

```
 99
100          }else if (metadatacols[filters[index]] == "double"){
101              tempFilterSQL += "!=999999999999999.000000"
102
103          }
104          filterSQL += filters[index] + tempFilterSQL
105       }else{
106          filterSQL += sqls[filters [index]]!
107       }
108       if index < filters.count-1{
109
110          filterSQL += keywordSPACE + keywordAND +
     keyword SPACE
111       }
112     }
113   }else{
114      for index in 0...filtersid.count-1{
115         filterSQL += sqls[filtersid[index]]!
116         if index < filtersid.count-1{
117
118             filterSQL += keywordSPACE + keywordAND +
     keyword SPACE
119          }
120      }
121   }
```

Figure 6:
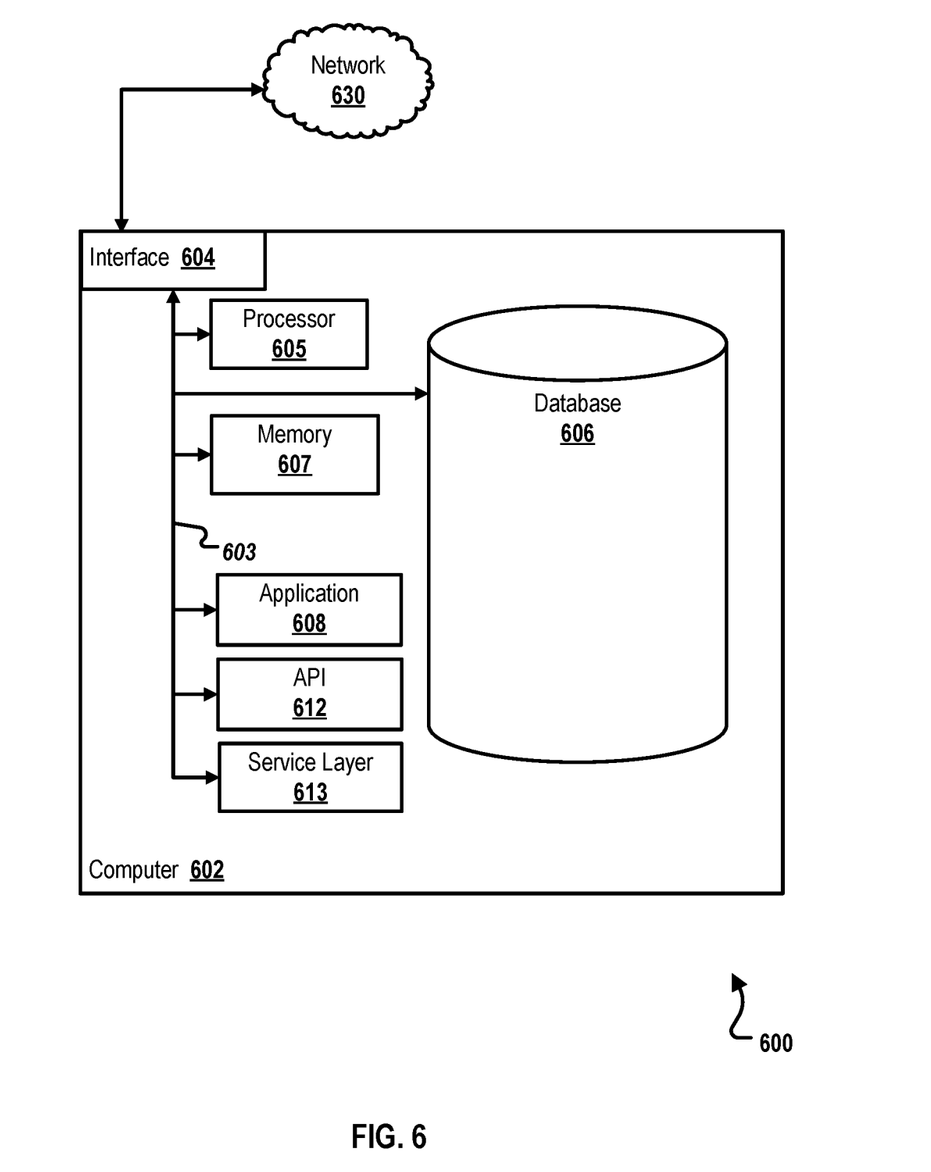
FIG. 6 is a block diagram illustrating an exemplary computer system used to provide computational functionalities associated with described algorithms, methods, functions, processes, flows, and procedures as described in the instant disclosure, according to an implementation.

FIG. 6 is a block diagram of an exemplary computer system 600 used to provide computational functionalities associated with described algorithms, methods, functions, processes, flows, and procedures as described in the instant disclosure, according to an implementation. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, or other server (or a combination of servers).

The computer 602 can receive requests over network 630 from a client application (for example, executing on another computer 602) and responding to the received requests by processing the said requests in an appropriate software application. In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602.

The interface 604 is used by the computer 602 for communicating with other systems in a distributed environment that are connected to the network 630 (whether illustrated or not). Generally, the interface 604 comprises logic encoded in software or hardware (or a combination of software and hardware) and operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory, conventional, or other type of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602.

The computer 602 also includes a memory 607 that can hold data for the computer 602 or other components (or a combination of both) that can be connected to the network 630 (whether illustrated or not). For example, memory 607 can be random access memory (RAM), read-only memory (ROM), optical, magnetic, and the like storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, applications, etc. Further, although illustrated as a single application 608, the application 608 may be implemented as multiple applications on the computer 602. In addition, although illustrated as integral to the computer 602, in alternative implementations, the application 608 can be external to the computer 602.

There may be any number of computers 602 associated with, or external to, a computer system containing computer 602, each computer 602 communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Described implementations of the subject matter can include one or more features, alone or in combination.

For example, in a first implementation, a computer-implemented method includes: receiving a document, the document including metadata for a data visualization of a data set, where the data set includes a plurality of data columns, each of the plurality of columns has a column name and a plurality of data values, and a first set of columns of the plurality of columns is present in the data visualization; determining the first set of columns based on the metadata; determining a second set of columns of the plurality of columns, where the second set of columns includes remaining columns of the plurality of columns excluding the first set of columns; ordering the data set by having the first set of columns prior to the second set of columns; and generating a composite index on the ordered data set.

The foregoing and other described implementations can each optionally include one or more of the following features:

A first feature, combinable with any of the following features, where the method further includes generating a query when at least one filter operation is applied to the second set of columns.

A second feature, combinable with any of the previous or following features, where generating the query includes for each column in the second set of columns: determining whether a filtering operation is applied to the column; in response to determining that a filtering operation is applied to the column and that the filter operation is associated with a particular filter value, including a filter for the column in the query, where the filter includes the particular filter value; and in response to determining that a filtering operation is not applied to the column, including a NOT filter for the column in the query, where the NOT filter includes a filter value different than the data values in the column.

A third feature, combinable with any of the previous or following features, where the method further includes generating a column value map, the column value map including a plurality of column values, where each of the plurality of column values corresponds to a particular column of the second set of columns and is different than the data values in the particular column.

A fourth feature, combinable with any of the previous or following features, where the method further includes: generating an index string based on the ordered data set, the index string including the column names of the first set of columns prior to the column names of the second set of columns; and storing the index string in an index array.

A fifth feature, combinable with any of the previous or following features, where the document includes metadata for a plurality of data visualizations of the data set.

A sixth feature, combinable with any of the previous or following features, where the method further includes, for each of the plurality of data visualizations: generating an index string for the data visualization; and if the index string is not present in an index array, storing the index string in the index array.

In a second implementation, a non-transitory, computer-readable medium storing one or more instructions executable by a computer system to perform operations including: receiving a document, the document including metadata for a data visualization of a data set, where the data set includes a plurality of data columns, each of the plurality of columns has a column name and a plurality of data values, and a first set of columns of the plurality of columns is present in the data visualization; determining the first set of columns based on the metadata; determining a second set of columns of the plurality of columns, where the second set of columns includes remaining columns of the plurality of columns excluding the first set of columns; ordering the data set by having the first set of columns prior to the second set of columns; and generating a composite index on the ordered data set.

The foregoing and other described implementations can each optionally include one or more of the following features:

A first feature, combinable with any of the following features, comprising one or more instructions to generate a query when at least one filter operation is applied to the second set of columns.

A second feature, combinable with any of the previous or following features, where generating the query includes for each column in the second set of columns: determining whether a filtering operation is applied to the column; in response to determining that a filtering operation is applied to the column and that the filter operation is associated with a particular filter value, including a filter for the column in the query, where the filter includes the particular filter value; and in response to determining that a filtering operation is not applied to the column, including a NOT filter for the column in the query, where the NOT filter includes a filter value different than the data values in the column.

A third feature, combinable with any of the previous or following features, comprising one or more instructions to generate a column value map, the column value map including a plurality of column values, where each of the plurality of column values corresponds to a particular column of the second set of columns and is different than the data values in the particular column.

A fourth feature, combinable with any of the previous or following features, comprising one or more instructions to: generate an index string based on the ordered data set, the index string including the column names of the first set of columns prior to the column names of the second set of columns; and store the index string in an index array.

A fifth feature, combinable with any of the previous or following features, where the document includes metadata for a plurality of data visualizations of the data set.

A sixth feature, combinable with any of the previous or following features, comprising one or more instructions to, for each of the plurality of data visualizations: generate an index string for the data visualization; and if the index string is not present in an index array, store the index string in the index array.

In a third implementation, a computer-implemented system includes a computer memory, and a hardware processor interoperably coupled with the computer memory and configured to perform operations including: receiving a document, the document including metadata for a data visualization of a data set, where the data set includes a plurality of data columns, each of the plurality of columns has a column name and a plurality of data values, and a first set of columns of the plurality of columns is present in the data visualization; determining the first set of columns based on the metadata; determining a second set of columns of the plurality of columns, where the second set of columns includes remaining columns of the plurality of columns excluding the first set of columns; ordering the data set by having the first set of columns prior to the second set of columns; and generating a composite index on the ordered data set.

The foregoing and other described implementations can each optionally include one or more of the following features:

A first feature, combinable with any of the following features, further configured to generate a query when at least one filter operation is applied to the second set of columns.

A second feature, combinable with any of the previous or following features, where generating the query includes for each column in the second set of columns: determining whether a filtering operation is applied to the column; in response to determining that a filtering operation is applied to the column and that the filter operation is associated with a particular filter value, including a filter for the column in the query, where the filter includes the particular filter value; and in response to determining that a filtering operation is not applied to the column, including a NOT filter for the column in the query, where the NOT filter includes a filter value different than the data values in the column.

A third feature, combinable with any of the previous or following features, further configured to generate a column value map, the column value map including a plurality of column values, where each of the plurality of column values corresponds to a particular column of the second set of columns and is different than the data values in the particular column.

A fourth feature, combinable with any of the previous or following features, further configured to: generate an index string based on the ordered data set, the index string including the column names of the first set of columns prior to the column names of the second set of columns; and store the index string in an index array.

A fifth feature, combinable with any of the previous or following features, where the document includes metadata for a plurality of data visualizations of the data set, and the hardware processor is further configured to, for each of the plurality of data visualizations: generate an index string for the data visualization; and if the index string is not present in an index array, store the index string in the index array.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   receiving, by one or more processors, a document, the document comprising visualization metadata for a data visualization of a data set and data set metadata comprising information of all columns of the data set, wherein the visualization metadata comprises information of all the columns of the data set present in a data visualization and indicates a mapping between the columns and vertical bars displayed relative to a horizontal axis and a vertical axis of the data visualization, and wherein the data set comprises a plurality of data columns, each of the plurality of data columns has a column name and a plurality of data values, and a first set of columns of the plurality of data columns is displayed by the data visualization;
   determining, by the one or more processors, the first set of columns displayed by the data visualization based on the visualization metadata;
   determining, by the one or more processors, a second set of columns of the plurality of data columns that are excluded from the data visualization, wherein the second set of columns comprises remaining columns of the plurality of data columns excluding the first set of columns;
   generating, by the one or more processors, an ordered data set by having the first set of columns prior to the second set of columns;
   generating, by the one or more processors, a composite index on the ordered data set, the composite index comprising an array, wherein each string of the array comprises a concatenation of visualization data values corresponding to the first set of columns and non-visualization data values corresponding to the second set of columns based on an order of the ordered data set;

generating, by the one or more processors, a query by retrieving at least one string from the composite index and for each column in the second set of columns:

determining whether a filtering operation is applied to the column,     in response to determining that the filtering operation is applied to the column and that the filter operation is associated with a first filter value, including a filter for the column in the query, wherein the filter comprises the first filter value, and     in response to determining that a filtering operation is not applied to the column, including a NOT filter for the column in the query, wherein the NOT filter comprises a second filter value different than the data values in the column; and processing, by the one or more processors, the query for the data visualization.

2. The computer-implemented method of claim 1, wherein generating the query comprises applying a plurality of filtering operations to the second set of columns.

3. The computer-implemented method of claim 1, further comprising:

generating a column value map, the column value map comprising a plurality of column values, wherein each of the plurality of column values corresponds to a particular column of the second set of columns and is different than the data values in the particular column.

4. The computer-implemented method of claim 1, wherein the document comprises metadata for a plurality of data visualizations of the data set.

5. The computer-implemented method of claim 4, further comprising for each of the plurality of data visualizations:

generating an index string for the data visualization; and if the index string is not present in an index array, storing the index string in the index array.

6. A non-transitory, computer-readable medium storing one or more instructions executable by a computer system to perform operations comprising:

receiving a document, the document comprising visualization metadata for a data visualization of a data set and data set metadata comprising information of all columns of the data set, wherein the visualization metadata comprises information of all the columns of the data set present in a data visualization and indicates a mapping between the columns and vertical bars displayed relative to a horizontal axis and a vertical axis of the data visualization, and wherein the data set comprises a plurality of data columns, each of the plurality of data columns has a column name and a plurality of data values, and a first set of columns of the plurality of data columns is displayed by the data visualization;

determining the first set of columns displayed by the data visualization based on the visualization metadata;

determining a second set of columns of the plurality of data columns that are excluded from the data visualization, wherein the second set of columns comprises remaining columns of the plurality of data columns excluding the first set of columns;

generating an ordered data set by having the first set of columns prior to the second set of columns;

generating a composite index on the ordered data set, the composite index comprising an array, wherein each string of the array comprises a concatenation of visualization data values corresponding to the first set of columns and non-visualization data values corresponding to the second set of columns based on an order of the ordered data set;

generating a query by retrieving at least one string from the composite index and for each column in the second set of columns:

determining whether a filtering operation is applied to the column,     in response to determining that the filtering operation is applied to the column and that the filter operation is associated with a first filter value, including a filter for the column in the query, wherein the filter comprises the first filter value, and in response to determining that a filtering operation is not applied to the column, including a NOT filter for the column in the query, wherein the NOT filter comprises a second filter value different than the data values in the column; and processing the query for the data visualization.

7. The non-transitory, computer-readable medium of claim 6, wherein generating the query comprises applying a plurality of filtering operations to the second set of columns.

8. The non-transitory, computer-readable medium of claim 6, comprising one or more instructions to generate a column value map, the column value map comprising a plurality of column values, wherein each of the plurality of column values corresponds to a particular column of the second set of columns and is different than the data values in the particular column.

9. The non-transitory, computer-readable medium of claim 6, wherein the document comprises metadata for a plurality of data visualizations of the data set.

10. The non-transitory, computer-readable medium of claim 9, comprising one or more instructions to, for each of the plurality of data visualizations:

generate an index string for the data visualization; and if the index string is not present in an index array, store the index string in the index array.

11. A computer-implemented system, comprising:

a computer memory; and a hardware processor interoperably coupled with the computer memory and configured to perform operations comprising:

receiving a document, the document comprising visualization metadata for a data visualization of a data set and data set metadata comprising information of all columns of the data set, wherein the visualization metadata comprises information of all the columns of the data set present in a data visualization and indicates a mapping between the columns and vertical bars displayed relative to a horizontal axis and a vertical axis of the data visualization, and wherein the data set comprises a plurality of data columns, each of the plurality of data columns has a column name and a plurality of data values, and a first set of columns of the plurality of data columns is displayed by the data visualization;

determining the first set of columns displayed by the data visualization based on the visualization metadata;

determining a second set of columns of the plurality of data columns that are excluded from the data visualization, wherein the second set of columns comprises remaining columns of the plurality of data columns excluding the first set of columns;

generating an ordered data set by having the first set of columns prior to the second set of columns;

generating a composite index on the ordered data set, the composite index comprising an array, wherein each string of the array comprises a concatenation of visualization data values corresponding to the first set of columns and non-visualization data values corresponding to the second set of columns based on an order of the ordered data set;

generating a query by retrieving at least one string from the composite index and for each column in the second set of columns:

determining whether a filtering operation is applied to the column,     in response to determining that the filtering operation is applied to the column and that the filter operation is associated with a first filter value, including a filter for the column in the query, wherein the filter comprises the first filter value, and     in response to determining that a filtering operation is not applied to the column, including a NOT filter for the column in the query, wherein the NOT filter comprises a second filter value different than the data values in the column; and processing the query for the data visualization.

12. The computer-implemented system of claim 11, wherein generating the query comprises applying a plurality of filtering operations to the second set of columns.

13. The computer-implemented system of claim 11, wherein the hardware processor is further configured to generate a column value map, the column value map comprising a plurality of column values, wherein each of the plurality of column values corresponds to a particular column of the second set of columns and is different than the data values in the particular column.

14. The computer-implemented system of claim 11, wherein the document comprises metadata for a plurality of data visualizations of the data set, and the hardware processor is further configured to, for each of the plurality of data visualizations:

generate an index string for the data visualization; and     if the index string is not present in an index array, store the index string in the index array.

* * * * *